Patented June 8, 1943

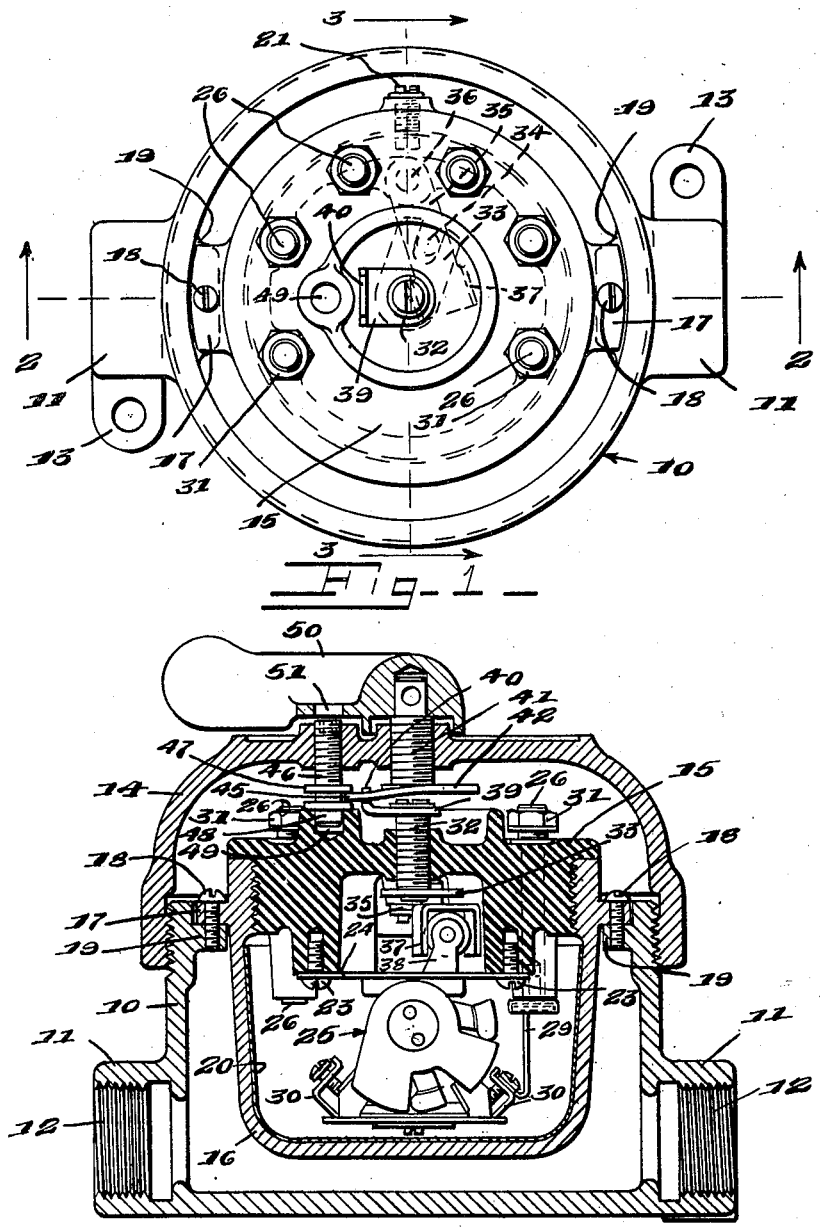

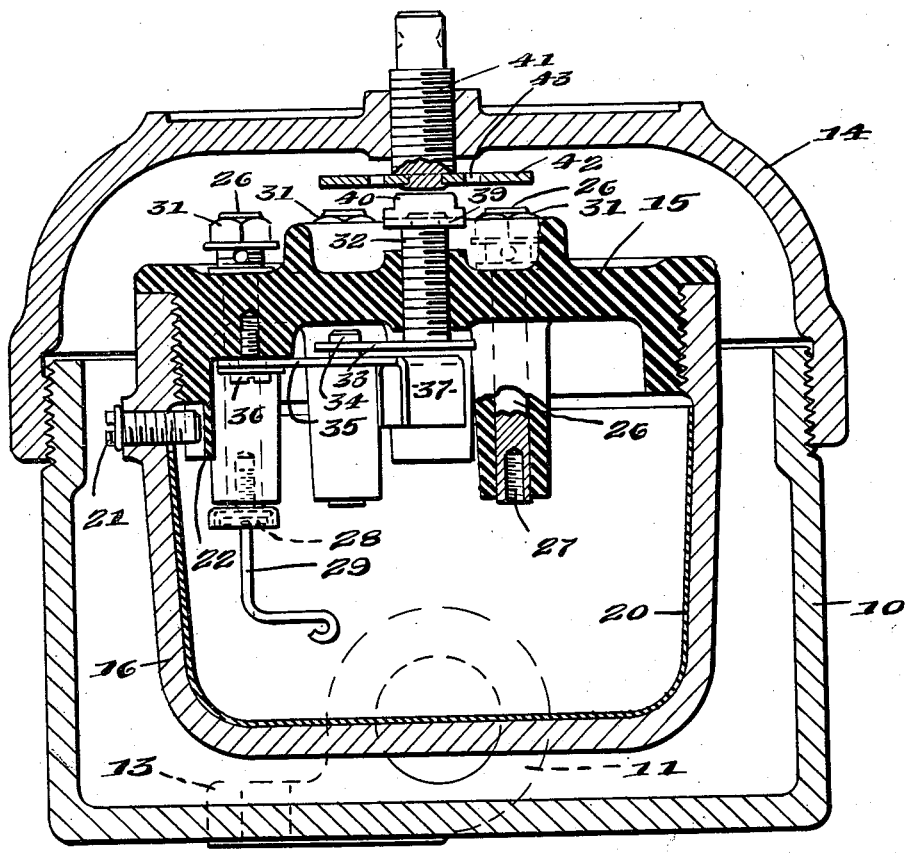

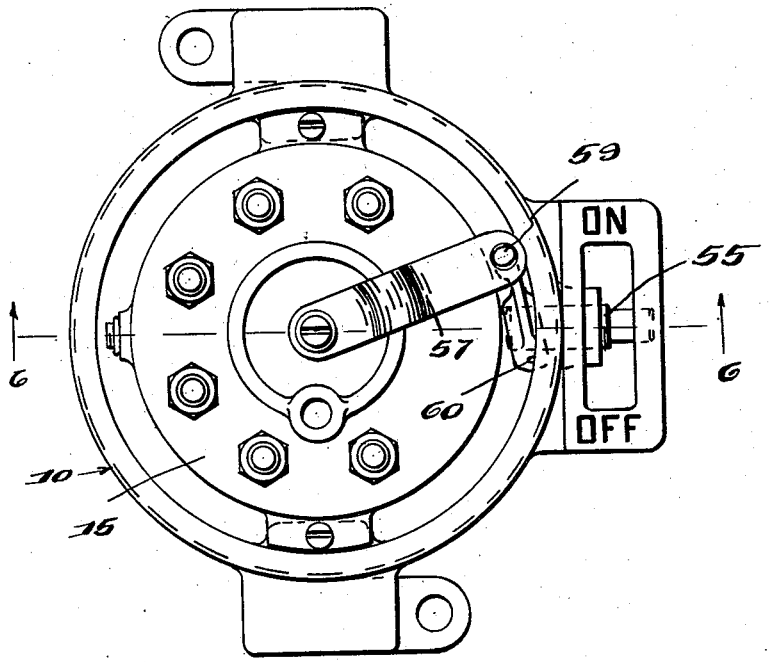
Fig. 5
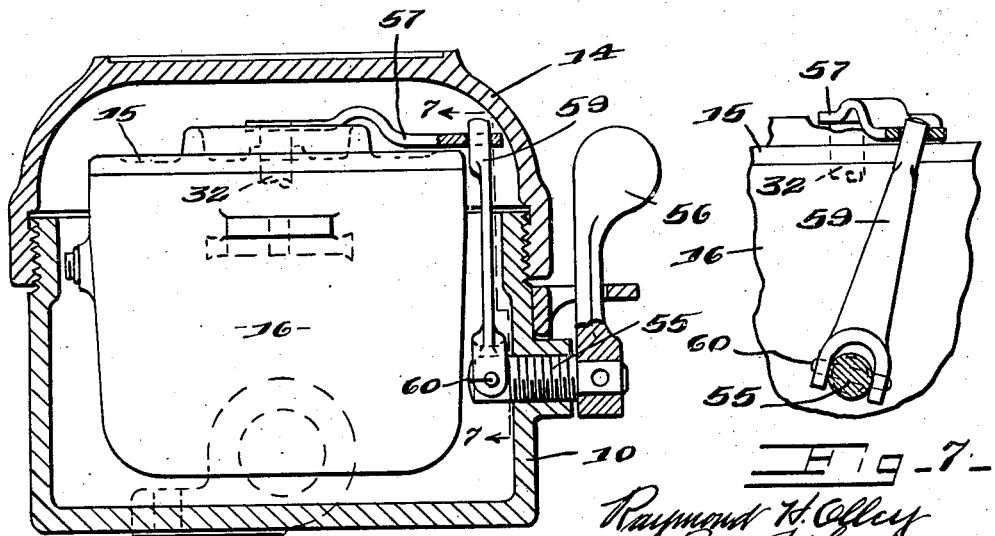
Fig. 6
Fig. 7
Raymond H. Olley
Ray F. Lester
INVENTORS.
BY Bedell & Thompson
ATTORNEYS.

2,321,508

UNITED STATES PATENT OFFICE 2,321,508

EXPLOSION-PROOF SWITCH HOUSING

Raymond H. Olley and Ray F. Lester, Syracuse, N. Y., assignors to Crouse-Hinds Company, Syracuse, N. Y., a corporation of New York Application September 11, 1940, Serial No. 356,366

9 Claims. (Cl. 200—168)

This invention relates to explosion proof switch housings or enclosures and has as a general object the embodiment of a particularly economical construction and one which is readily adapted for various installations. For example, in some installations it is necessary to enclose the switch in flame tight relation from the conduit system and to provide means for maintaining the conduit system in flame tight relation to the surrounding atmosphere. In other installations, it is not necessary to separately house or enclose the switch from the conduit line, but the switch may be mounted in a flame tight housing, the interior of which is connected to the line. It is also desirable, in some instances, to operate the switch by mechanism mounted in the cover of the housing, and in other instances by mechanism mounted in the body of the housing. Heretofore special fittings have been employed for each particular type of installation.

In the case of our present invention, we employ an outer and inner flame tight enclosure, these enclosures embodying a construction by which the fitting is conveniently installed, and the switch or other apparatus mounted in the fitting is conveniently connected to the conductors of the system. In particularly hazardous locations, both of the closure members are employed and whereby the switch is mounted within the inner enclosure and is sealed off from the outer enclosure and the conduit line in flame tight relation.

The invention has as a further object a particularly novel switch actuating mechanism embodying a simplified and economical construction whereby the cover of the outer enclosure can not be removed unless the switch is in the off position, the switch actuating mechanism including members movable into and out of engagement from the exterior of the outer enclosure, whereby the inner enclosure, with the switch mounted therein, may be secured in the outer enclosure and the terminals of the switch conveniently wired to the conductors of the conduit system.

The invention consists in the novel features and in the combinations and constructions hereinafter set forth and claimed.

In describing this invention, reference is had to the accompanying drawings in which like characters designate corresponding parts in all the views.

Figure 1 is a top plan view of a switch housing embodying our invention with the cover of the outer enclosure removed.

Figure 2 is a vertical sectional view taken on line 2—2, Figure 1, and including the cover of the outer enclosure and the switch operating mechanism carried thereby and with the motion transmitting members thereof arranged in engagement.

Figure 3 is a vertical sectional view, similar to Figure 2, taken on line 3—3, Figure 1.

Figure 4 is a top plan view of the movable element of the switch actuating mechanism.

Figure 5 is a view, similar to Figure 1, embodying a modified form of switch actuating mechanism mounted in the body member of the outer enclosure.

Figure 6 is a view taken on line 6—6, Figure 5 and including the cover of the outer enclosure.

Figure 7 is a side elevational view of the rock shaft arm of the switch actuating mechanism shown in Figures 5 and 6 and including a contiguous portion of the fitting.

Our explosion proof or flame tight switch housing comprises an outer enclosure consisting of a body 10. As here shown the body is of substantially cylindrical formation and is provided with one or more radially extending hubs 11 threaded internally as at 12 to receive the ends of the conduit. The hubs 11 are formed with apertured laterally extending ears 13 which act as a convenient means for securing the fitting to a wall or other support.

The outer enclosure further includes a dome shaped cover 14 which is detachably secured to the open side of the body in flame tight relation thereto as by being threaded on the open end thereof, see Figure 2.

The fitting further includes an inner enclosure consisting of a circular switch support 15 preferably formed of insulating material with a portion of the periphery threaded to receive a cup shaped cover member 16 which is formed with laterally extending bosses 17 apertured to receive screws 18 with which the inner enclosure is detachably mounted on bosses 19 in the outer enclosure. The cup shaped cover member is preferably provided with a liner 20 of fibrous insulating material, and the cover 16 is maintained in place by a set screw 21 threading through the cover and engaging a recess in a boss 22 depending from the switch support 15. The arrangement is such that the enclosures are mounted substantially concentrically providing an ample space between the inner and outer enclosures through which the conductors may be conveniently manipulated, and the bottom of the inner cover member 16 is arranged in spaced relation to the bottom wall of the housing 10, see Figure 2.

The cylindrical member 15 serves as a switch support, the under or inner side of the support being provided with threaded apertures to receive screws 23 by means of which the conventional supporting plate 24 of a switch 25 is secured to the switch support 15. A plurality of metallic conductors or studs 26 are moulded or otherwise embedded in the switch support 15 in flame tight relation thereto, the lower ends of the studs 26 being formed with threaded apertures 27 to receive binding screws 28 which serve to connect short leads 29 extending from the terminals 30 of the switch to the studs. The studs 26 extend through the switch support 15 and the outer ends are threaded to receive binding nuts 31 which are employed to connect the wires or conductors of the conduit line to the studs.

The switch support 15 is also provided with switch actuating mechanism which consists of a stem 32 threaded in the switch support and being provided at its lower end with a radially extending arm 33, the free end of which is bifurcated to receive a pin 34 mounted intermediate the ends of an arm 35, one end of which is pivotally mounted upon a screw 36 threaded into the switch support and the other end being formed with a depending fork 37 engaging the switch handle 38. The upper end of the stem 32 is also provided with a radially extending arm 39 formed at its free end with a bent up portion 40. The arrangement is such that upon oscillation of the stem 32 the switch handle is actuated into on and off positions, and due to the fact that the stem 32 is threaded into the switch support 15 it is arranged in flame tight relation thereto.

The switch 25 is mounted upon the switch support and the leads 29 properly connected to the switch and the lower ends of the studs 26, and the cover 16 is screwed upon the switch support at the factory, this assembly being delivered to the customer as a unit.

In installing the fitting, the electrician connects the body 10 into the conduit line and thereafter may conveniently pull the conductors through the conduit inasmuch as the entire interior of the body 10 is available for such purpose. The conductors, to which the switch is to be connected, are brought outwardly through the open side of the body and arranged adjacent the side wall thereof whereupon the enclosed switch unit is inserted in the body and secured therein by the screws 18. Thereafter, the extending ends of the conductors are conveniently attached to the studs 26 by the binding nuts 31.

In Figures 1 and 2, the cover 14 of the outer enclosure is provided with operating mechanism operable externally of the cover to effect oscillation of the stem 32. This mechanism consists of a stem 41 threading into the cover and being provided at its lower end with a disk 42. The disk 42 is formed with an arcuate slot 43 of appreciable length and merging at its center portion with an elongated rectangular slot 44.

When the cover 14 is screwed into place on the body 10, the disk 42 is arranged slightly above the bent up end portion 40 of the arm 39. The disk 42, or that portion 45 thereof adjacent the slot 44, is moved downwardly or in an axial direction toward the arm 39 by a stud 46 threaded into the cover at one side of the stem 41 and being provided adjacent its lower end with a collar 47 formed with an annular groove to receive the edge portion 45 of the disk. The upper end of the stud 46 is recessed or slotted to receive a screw-driver or other implement to effect rotation of the stud.

When the stud 46 is screwed inwardly, the collar 47 causes the portion 45 of disk 42 to spring downwardly whereby the slot 44 receives the bent up end portion 40 of arm 39. This movement is readily effected because of the arcuate slot 43, see Figure 2. With the disk 42 thus moved into engagement with the arm 39, the stem 41 is operatively connected to the stem 32. When the parts as in this position, the lower end portion 48 of the stud 46 is arranged in a recess 49 formed in the top surface of the switch support 15 and thus forms a lock to prevent rotation of the cover 14 and accordingly, its removal from the housing 10.

The upper end of the stem 40 is provided with a suitable actuating handle 50 which is formed with an aperture 51 arranged in register with the top of the stud 46 when the switch is actuated to the off position, as shown in Figure 2. When the switch is actuated to the on position, the body of the handle 50 moves over the end of the stud 46 and thereby renders it inaccessible. Accordingly, the cover 14 can not be removed from the body 10 until the switch is first moved to the off position and the stud 46 threaded outwardly. This arrangement not only prevents removal of the cover 14 while the switch is in the on position, which would be extremely dangerous in a hazardous location, but also prevents rotation of the cover 14 and consequent damage to the switch actuating mechanism while the disk 42 is in engagement with the arm 39.

In the structures shown in Figures 5, 6 and 7, the cover 14 is not provided with switch operating mechanism but the same is movably mounted in the side wall of the housing 10. This mechanism consists of a stem 55 threaded through the wall of the housing and provided at its outer end with a suitable operating handle 56. In this instance, the upper end of the stem 32 is provided with a radially extending arm 57 which extends slightly beyond the periphery of the switch support 15 and is provided at its outer end with an aperture to receive the upper end of an arm 59, the lower end of which is bifurcated to receive the inner end of the stem 55 and is pivotally secured thereto as by pin 60. With this arrangement, oscillation of the handle 56 effects arcuate movement of the arm 57 and accordingly oscillation of the stem 32.

What we claim is:

1. A flame tight switch enclosure comprising a switch supporting member, a switch mounted on said supporting member, a plurality of lead conductors extending from the terminals of said switch through said supporting member and externally thereof and being sealed in flame tight relation in said member, switch actuating mechanism carried by said supporting member and being operable externally thereof, and a cover member enclosing said switch, and means operable to detachably secure said members together in flame tight relation.

2. An explosion proof switch housing comprising an outer enclosure including a body member and a cover member detachably secured thereto in flame tight relation, an inner enclosure including a switch support and a cover detachably secured in flame tight relation to said switch support, means operable to detachably secure said inner enclosure in said outer enclosure, switch actuating mechanism carried by said switch support and operating mechanism movably mounted in said outer enclosure and operable externally thereof to actuate said switch actuating mechanism.

3. An explosion proof switch housing comprising an outer enclosure including a body member and a cover detachably secured thereto in flame tight relation, an inner enclosure member comprising a switch support and a cover detachably secured thereto, a switch mounted upon said switch support and enclosed by said cover, a plurality of lead conductors extending from the terminals of said switch through said switch support and externally thereof, switch actuating mechanism carried by said supporting member and being operable externally thereof, said conductors and switch operating mechanism being sealed in flame tight relation in said switch support, operating mechanism movably mounted in said outer enclosure and being operable externally thereof to actuate said switch actuating mechanism.

4. An explosion proof switch housing comprising an outer flame tight enclosure, an inner flame tight enclosure arranged within said outer enclosure, switch actuating mechanism carried by said inner enclosure and operable to move the switch into on and off positions, operating mechanism carried by said outer enclosure, one of said mechanisms including motion transmitting means operable externally of said outer enclosure after assembly to operatively connect said mechanisms together.

5. An explosion proof switch housing comprising a box open at one side, a cup shaped member mounted in the box, a switch supporting member, a switch mounted on said switch supporting member, said member being threaded into the open end of said cup shaped member, a plurality of lead conductors extending from the terminals of said switch through said switch supporting member and being sealed in flame tight relation in said member, switch operating mechanism carried by said switch supporting member and operable externally thereof to move said switch into on and off positions, means operable to detachably secure said cup shaped member in said housing, a cover for the open end of said housing detachably secured thereto in flame tight relation, and operating mechanism carried by said cover and operable externally thereof to actuate said switch actuating mechanism carried by said switch supporting member.

6. An explosion proof switch housing comprising a body formed with an opening in one side thereof and being provided with conduit receiving passages, a cup shaped member detachably mounted in said body, a switch support secured in the open end of said cup shaped member in flame tight relation thereto, a switch mounted on said support and arranged within said cup shaped member, a plurality of lead conductors extending from the terminals of said switch through said support, switch actuating mechanism carried by the support and being operable externally thereof to move the switch into on and off positions, said conductors and switch actuating mechanism being sealed in said support in flame tight relation, a cover for the open side of the body, and means operable to detachably secure the cover to the body in flame tight relation therewith, operating mechanism carried by the cover and operable to actuate said switch actuating mechanism.

7. An explosion proof switch housing comprising a body being formed with an opening in one side thereof and being provided with conduit receiving passages, a cup shaped member arranged in the body, a switch support detachably secured in the open end of said cup shaped member in flame tight relation thereto, a switch mounted on said support and arranged in said cup shaped member, a plurality of lead conductors extending from the terminals of said switch through said switch support, switch actuating mechanism carried by the support and being operable to move the switch into on and off positions, said conductors and switch operating mechanism being sealed in flame tight relation in the switch support, a cover detachably secured to the open end of the body in flame tight relation thereto, and switch operating mechanism operable from the exterior of the body to actuate said switch actuating mechanism.

8. An explosion proof switch housing comprising a body formed with an opening in one side and being provided with a conduit receiving passage, an enclosed flame tight switch unit detachably mounted in the body and being provided with switch actuating mechanism, a cover threaded on the body and forming a flame tight closure for said opening, switch operating mechanism carried by the cover, a motion transmitting member carried by each of said mechanisms, one of said members being movable into and out of engagement with said other member, means carried by the cover and operable externally thereof to move said movable member into and out of engagement with said other member, said means being operable to move said member out of engagement when the switch is in the off position and being operable to prevent movement of the switch into the on position until said member has been moved into engagement with said other member.

9. An explosion proof switch housing comprising a body having an opening in one side thereof and being provided with a conduit receiving passage, a cover for said opening detachably secured to the body in flame tight relation thereto, a flame tight switch enclosure unit mounted in the body, a switch mounted in said unit, a switch actuating mechanism carried by said unit and operable to move the switch into on and off positions, operating mechanism carried by the cover of said body, and motion transmitting means carried by one of said mechanisms and operable externally of the cover after the cover is secured to said body to operatively connect said mechanisms.

RAYMOND H. OLLEY.
RAY F. LESTER.